United States Patent
Li et al.

(10) Patent No.: US 8,254,778 B2
(45) Date of Patent: Aug. 28, 2012

(54) METHOD, APPARATUS AND SYSTEM FOR HANDLING FIBER LINE FAULT

(75) Inventors: Congqi Li, Shenzhen (CN); Hao Wang, Shenzhen (CN); Yiquan Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 935 days.

(21) Appl. No.: 12/104,538

(22) Filed: Apr. 17, 2008

(65) Prior Publication Data

US 2009/0324214 A1 Dec. 31, 2009

Related U.S. Application Data

(63) Continuation of application No. PCT/CN2006/003338, filed on Dec. 8, 2006.

(30) Foreign Application Priority Data

Dec. 9, 2005 (CN) .......................... 2005 1 0130383

(51) Int. Cl.
*H04B 10/08* (2006.01)

(52) U.S. Cl. .......................................... 398/6

(58) Field of Classification Search .............. 398/1, 6
See application file for complete search history.

(56) References Cited

U.S. PATENT DOCUMENTS

| | | | |
|---|---|---|---|
| 5,959,767 A | 9/1999 | Fatehi et al. | |
| 6,008,915 A | 12/1999 | Zyskind | |
| 6,344,915 B1 | 2/2002 | Alexander et al. | |
| 7,202,995 B2 * | 4/2007 | Fishman et al. | 359/334 |
| 7,218,442 B2 * | 5/2007 | Akbaba et al. | 359/334 |
| 7,437,069 B2 * | 10/2008 | Deguchi et al. | 398/31 |
| 7,831,144 B2 * | 11/2010 | Emongkonchai | 398/2 |
| 2004/0179836 A1 | 9/2004 | Yamaguchi et al. | |
| 2004/0208519 A1 * | 10/2004 | Feldman et al. | 398/30 |

FOREIGN PATENT DOCUMENTS

| | | | |
|---|---|---|---|
| CN | 1165444 A | 11/1997 | |
| CN | 1190860 A | 8/1998 | |

OTHER PUBLICATIONS

International Search Report for International Application No. PCT/CN2006/003338, dated Mar. 6, 2007, with English translation.
First Chinese Office Action regarding Chinese Application No. 200510130383.5, mailed Dec. 7, 2007. Translation provided by Huawei Technologies Co., Ltd.
Second Office Action regarding Chinese Application No. 200510130383.5, mailed Jan. 9, 2009. Translation provided by Huawei Technologies Co., Ltd.
Office Action regarding Russian Application No. 2008118233/09(021056), dated Dec. 8, 2006.
Written Opinion of the International Searching Authority regarding Application No. PCT/CN2006/003338, mailed Mar. 22, 2007. Translation provided by Huawei Technologies Co., Ltd.

\* cited by examiner

*Primary Examiner* — Leslie Pascal
(74) *Attorney, Agent, or Firm* — Harness, Dickey & Pierce, P.L.C.

(57) ABSTRACT

A method for handling a fiber line fault is provided. The method includes: loading, by a station, an indication signal carrying alarm suppression information onto an optical signal to be output to a downstream fiber of the station upon detection of a fault on upstream fiber line; keeping in a normal working status, by a downstream station upon a receipt of the optical signal with the indication signal. The various embodiments of the present disclosure suppress alarms from downstream amplifier stations which are not adjacent to the failure link and further suppress APR or APSD procedures according to the alarms.

16 Claims, 3 Drawing Sheets

METHOD, APPARATUS AND SYSTEM FOR HANDLING FIBER LINE FAULT

CROSS-REFERENCE TO RELATED APPLICATIONS

This application is a continuation of International Application No. PCT/CN2006/003338, filed Dec. 8, 2006. This application claims the benefit of Chinese Application No. 200510130383.5, filed Dec. 9, 2005. The disclosures of the above applications are incorporated herein by reference.

FIELD

The present disclosure relates to optical communication technologies, and more particularly, to a method for handling a fiber line fault, a method for restoring an optical communication system on the basis of the method for handling a fiber line fault, apparatuses and an optical communication system for suppressing downstream alarms induced by a fiber line fault.

BACKGROUND

The statements in this section merely provide background information related to the present disclosure and may not constitute prior art.

Because of the excellent directivity, the power density of laser in the output direction is especially high, which greatly threatens human eyes. The wavelength of lasers used in the existing communication system is generally around 870 nm, 1310 nm and 1550 nm, which are all beyond the wavelength range of visible light. Because it is invisible, the light beam has a greater possibility to hurt human eyes. After the inventions of Erbium-Doped Fiber Amplifier (EDFA) and Wavelength Division Multiplexing (WDM) techniques, the output power of optical signals carried in fibers is even higher than that of conventional Synchronous Digital Hierarchy (SDH) devices. In addition, such apparatuses as RAMAN amplifier may be introduced into the existing communication system, which makes the power of the optical signals carried in fibers of some systems reach or even exceed 30 dBm. Such a high power of the optical signal greatly threatens the safety of operators and maintenance personnel of telecommunication system.

The safety level of laser apparatus and device is defined in Standard IEC60825, which specifies the specific operational measure and safety identifier as well. The International Telecommunication Union-Telecommunication Standardization Sector (ITU-T) constitutes Standard G.664 for laser safety in communication system, and puts forward that an optical communication apparatus should be able to automatically reduce the output power to the safe power and even turn off the laser when a laser leakage occurs, which is expressed as the Automatic Power Reduction (APR) and the Automatic Power Shutdown (APSD) solution in G.664.

The APR is implemented by adding link status detection components and laser output control components in optical communication devices. When there is a potential laser leakage due to a failure on a fiber, the link status detection component in a downstream station detects loss of optical power, and determines that there is a potential laser leakage on an upstream link. The output power in an upstream direction of the downstream station is reduced via the corresponding laser output control component. The upstream station detects power reduction of the downstream station, and reduces output power in the downstream direction accordingly to reduce hazards caused by the laser leakage.

An APR procedure of a common optical amplifier in an optical communication system is described in detail as an example.

As shown in FIG. 1, when there is a potential laser leakage due to a failure on the west fiber from station B to station A, the west optical amplifier of station A detects loss of the optical signal sent from station B by the link state detecting component, and determines that there is a potential laser leakage on the fiber from station B to station A. The potential laser leakage may also exist on the fiber from station A to station B, and therefore, the west optical amplifier of station A instructs the east optical amplifier of station A to reduce the output power to make the laser leakage on the fiber from station A to station B compatible with the safety level constituted by Standard IEC60825, thereby protecting the operator and maintenance personnel. The east optical amplifier of station B detects the power reduction or loss of the east optical signal. The east optical amplifier of station B performs the same procedure described above. In other words, the east optical amplifier of station B notifies the west optical amplifier of station B to reduce the output power to make the laser leakage from station A to station B compatible with the safety level constituted by Standard IEC60825.

The implementation procedure of APSD is similar to that of APR, and the difference is that the APSD solution is to directly shut down a laser or an optical amplifier, rather than reduce the output power to a preset power.

The APR and the APSD of the existing communication apparatuses are basically implemented by detecting optical power. In other words, when the optical power in the receiving direction is abnormal, optical power output in its reverse direction is reduced or shut down at once, so the laser leakage in the reverse direction is ensured to meet the requirement of safety standard, and an opposite side device is also instructed to perform the protection procedure. The key of the APR and the APSD solutions is detecting whether the received optical power is below a certain threshold to decide whether there is a potential laser leakage on the fiber. However, the APR is unavailable with the optical power detection alone where RAMAN amplifiers or remotely-pumped amplifiers are applied.

As shown in FIG. 2, where a RAMAN amplifier or a remotely-pumped amplifier is applied, pump light of the RAMAN amplifier or the remotely-pumped amplifier is usually inputted into a transmission fiber in the reverse direction of signal light. When a west fiber from station B to station A fails, e.g. breaks, and poses a potential laser leakage, a west receiving side of station A always detects high optical power because a part of inputted pump light is reflected back and also a reversed stimulated Raman radiation generated in the same direction of the optical signals is received by station A. In such case, the optical power detection is insufficient for determining whether a network breaks and whether there is a potential laser leakage in a network correctly.

Multiple technical solutions have emerged to solve safety problems of laser leakage in optical communication systems where auxiliary amplifier devices such as RAMAN amplifiers or remotely-pumped amplifiers are applied. Typical solutions include detecting fiber line faults with an optical monitor channel, judging fiber line faults by a majority voting mechanism of optical channels, and even judging fiber line faults according to an Optical Signal to Noise Ratio (OSNR) and an electronic Signal to Noise Ratio (SNR).

Yet the safety problems of laser leakage include not only initiating the APR or APSD procedure when there is a potential laser leakage, but also launching a restart procedure safely to restore the communication system to a normal working status when the fiber line fault is repaired. The restoration procedure of an optical communication system is mentioned in the ITU-T G.664, illustrated as follows.

When a fiber link fault occurs, upstream stations and downstream stations initiate restoration timing respectively, and launch a self restoration procedure when the restoration timing is up. Provided an upstream terminal or a downstream terminal ends the restoration timing first, the terminal that ends the restoration timing first sends a detection pulse. When detecting the detection pulse, an amplifier in a direction of the detection pulse determines that an upstream link in the direction has been restored to normal, and sends the detection pulse along the same direction after amplifying the detection pulse. At last, the detection pulse reaches a downstream terminal in the direction. The downstream terminal in the direction, upon a receipt of the detection pulse, restores output power in a reverse direction. Likewise, the light in the reverse direction is also amplified by amplifiers along the reverse direction. If the fiber line has been restored to normal, the terminal which sends the detection pulse detects the light in the reverse direction and thus determines that the network has been restored to normal, and the whole restoration procedure is accomplished.

As shown in FIG. 3, provided that an upstream terminal initiates a restoration request first and sends a detection pulse at time point t1. The power of the detection pulse is lower than or equal to a safety power threshold. If a fiber link is restored, a downstream terminal detects the detection pulse and restores normal output power in a reverse fiber link at time point t2 after a time delay. The upstream terminal, upon detection of the output power in the reverse direction at time point t3, learns that the network has been restored, and restores the output power of the detection pulse to normal output power. Hence the whole fiber link is restored to normal. If the fiber link has not been restored, the downstream terminal is unable to detect the detection pulse and does not open the light path in the reverse direction. Consequently the upstream terminal receives no feedback and thus stops sending the detection pulse when a waiting time is up. If the reverse fiber link has not been restored, the optical output by the downstream terminal is unable to reach the upstream terminal, and the upstream terminal shuts down the optical output when a waiting time is up. Consequently the downstream terminal shuts down optical output because no optical signal is received.

The restoration procedure described in the ITU-T G.664 is performed between an upstream terminal and a downstream terminal. It is obvious that all amplifiers between the upstream terminal and the downstream terminal enter a failure state when one segment of the fiber line breaks. Because amplifiers adjacent to the broken segment shut down optical output once the fault is detected, which results in that even non-adjacent amplifiers consequentially shut down optical output. Because it takes time for each of the amplifier to restore normal output, hence a self restoration of the whole optical communication system needs a very long period of time which grows even longer when more cascade amplifiers are connected. Furthermore, once a fiber segment breaks, all neighboring amplifiers shut down output and all downstream amplifiers determine that the network fails and announce alarm because the downstream amplifiers receive no optical signal. As a result, all nodes in the network announce alarms, making it extremely difficult to locate the broken fiber segment in the whole network, and the abrupt alarms congest overhead channels and servers of the system, and the whole network is put in disturbance.

SUMMARY

In view of the above, various embodiments of the present disclosure provide a method for handling a fiber line fault, suppressing alarms from downstream stations and amplifiers which are not adjacent to the broken segment, and further suppressing APR or APSD procedures according to the alarms. Therefore, the time needed for a self restoration from the APR or APSD procedures is reduced.

A method for handling a fiber line fault includes: loading, by a station, an indication signal carrying alarm suppression information onto an optical signal to be output to a downstream fiber upon detection of a fault on upstream fiber line; and keeping in a normal working status, by a downstream station upon a receipt of the optical signal with the indication signal.

Various embodiments of the present disclosure provide a method for restoring an optical communication system to reduce the time needed for a self restoration from the APR or APSD procedures.

A method for restoring an optical communication system includes:

loading, by a station adjacent to a failed link, an indication signal carrying alarm suppression information onto an optical signal to be output to a downstream fiber of the station upon detection of a fiber line fault;

keeping in a normal working status, by a downstream station upon a receipt of the optical signal with the indication signal; and stopping loading, by the station adjacent to the failed link, upon detection of restoration of the fiber line fault, the indication signal carrying the alarm suppression information onto the optical signal to restore a normal working status.

Various embodiments of the present disclosure provide an apparatus for suppressing downstream alarms induced by a fiber line fault, suppressing alarms from downstream stations and amplifiers which are not adjacent to the broken segment, and further suppressing APR or APSD procedures according to the alarms.

An apparatus for suppressing downstream alarms induced by a fiber line fault includes:

a control unit, configured to load a control signal onto a pump current through adjusting the pump current, upon detection of a fault on upstream fiber line;

a pump laser unit, configured to generate pump light and control the pump light to change according to a predetermined pattern based on the pump current from the control unit; and a gain unit, configured to load an indication signal carrying alarm suppression information onto optical signal according to the pump light from the pump laser unit, amplify and output the optical signals.

Another apparatus for suppressing downstream alarms induced by a fiber line fault includes:

a gain unit, configured to amplify and output an input optical signal;

a control unit, configured to generate and control a pump current;

a pump laser unit, configured to generate pump light based on the pump current from the control unit; wherein the gain unit comprises a signal intensity modulation module in a output side, for loading an indication signal carrying alarm suppression information onto an optical signal via controlling a intensity variation of the optical signal according to a input control signal.

Various embodiments of the present disclosure provide an optical communication system for suppressing downstream alarms induced by a fiber line fault, suppressing alarms from downstream stations and amplifiers which are not adjacent to the broken segment, and further reducing the time needed for a self restoration from the APR or APSD procedures.

An optical communication system for suppressing downstream alarms induced by a fiber line fault includes at least two amplifier stations connected with a fiber, where a upstream station is configured to load an indication signal carrying alarm suppression information onto optical signal to be output, upon detection of a fiber line fault on a fiber link adjacent to the upstream station;

a downstream station is configured to keep in a normal working status, upon a receipt of the indication signal carrying the alarm suppression information.

It can be seen from the description, in various embodiments of the present disclosure, amplifiers adjacent to a broken segment indicates that a fault exists on an upstream fiber segment to downstream amplifiers, so as to solve the conventional problems including one fiber fault causes all amplifiers in a multiplex section to close, which results in a long restoration time, and all amplifiers announcing alarms which makes it extremely difficult to locate the network fault. Using the various embodiments of the present disclosure, downstream stations which are not adjacent to the broken segment are suppressed alarms, the APR or APSD procedures according to the alarms are suppressed, so that the downstream amplifiers do not all close and the time needed for a self restoration of the APR or APSD procedures is reduced. Using the various embodiments of the present disclosure, multiple stations are prevent from announcing alarms at the same time so that the alarm channel is not congested, work loads of network administrators are reduced, efficiency of the network administrator is improved, fiber faults may be located faster and more accurately, and the time needed for the self restoration from the fault is saved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7:
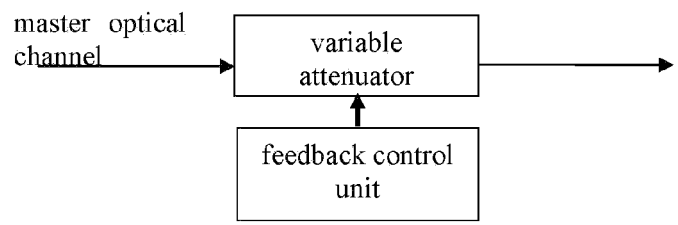
Figure 8:
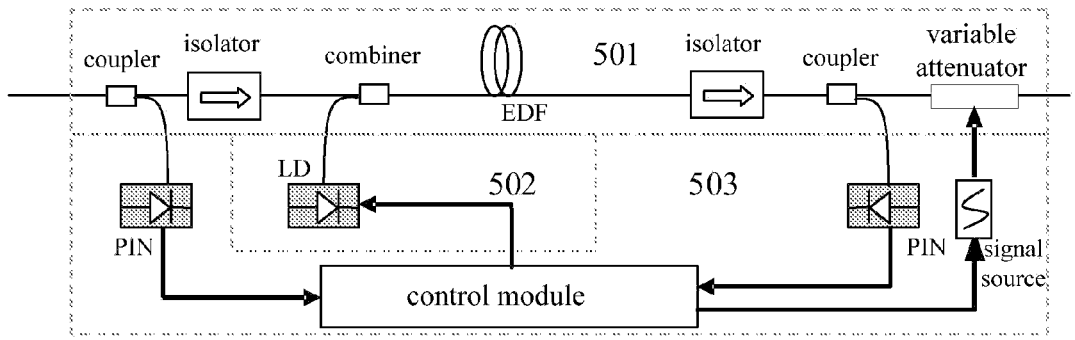

FIG. 7 is a schematic diagram illustrating a basic theory of loading an indication signal in a master optical channel by a variable attenuator in accordance with various embodiments of the present disclosure; and FIG. 8 is a schematic diagram illustrating an embodiment of an optical amplifier which loads an indication signal in a master optical channel by a variable attenuator in accordance with various embodiments of the present disclosure.

DETAILED DESCRIPTION

The following description is merely exemplary in nature and is not intended to limit the present disclosure, application, or uses.

The basic theory of a method provided by various embodiments of the present disclosure for suppressing alarms of fiber line faults from downstream stations includes: when a fiber segment breaks, loading by a downstream station adjacent to the broken segment, upon a detection of a fiber line fault, an indication signal onto optical signals output to a downlink to indicate the fault on the upstream link. Hence downstream stations which are not adjacent to the broken segment are suppressed alarms, and APR or APSD procedures invoked by receiving no optical signals at the downstream stations are stopped. Furthermore, because amplifiers which are not adjacent to the broken segment are not closed when the fiber segment is being repaired, the time needed for self restoration is reduced significantly.

When a fiber segment of a fiber line breaks, a downstream amplifier adjacent to the broken segment detects a Loss of Signal (LOS), and determines that the upstream link may be broken and a potential laser leakage may exist. Therefore the downstream amplifier shuts down output in a reverse direction, i.e. the output from the amplifier to the direction of the broken segment. The downstream amplifier inserts a special indication signal (e.g. Forward Defect Indication, FDI) carrying specific information into the optical signals, and outputs the optical signals to the downlink for indicating a upstream fiber fault to the downstream amplifier stations so as to suppress alarms in the downstream amplifier stations. Because the station adjacent to the broken segment is obliged to send optical signals to the downlink, the downstream stations always detect optical signals (no power loss) and thus does not determine that upstream signals are lost, nor the downstream stations perform APR or APSD procedures. The objectives of the present disclosure are thus achieved.

A work flow of a method for suppressing downstream alarms induced by a fiber line fault is described in detail hereafter with reference to the accompanying drawings.

Figure 1:
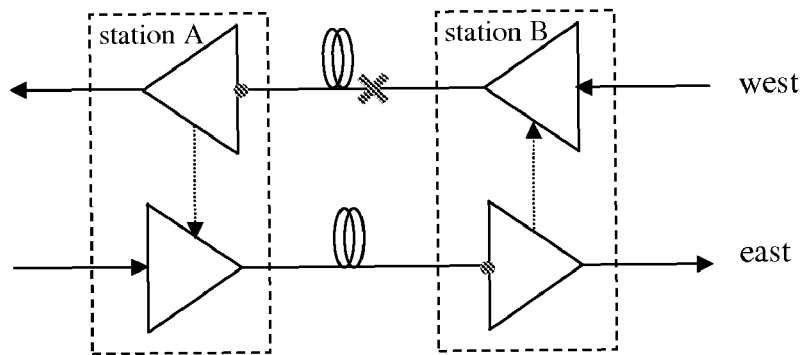
FIG. 1 is a schematic diagram illustrating an APR procedure of optical amplifiers.
Figure 2:
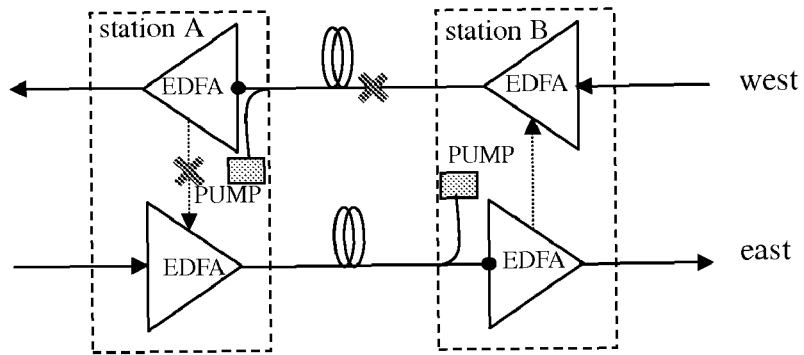
FIG. 2 is a schematic diagram illustrating an APR procedure of optical amplifiers which includes RAMAN amplifiers or remotely-pumped amplifiers.
Figure 3:
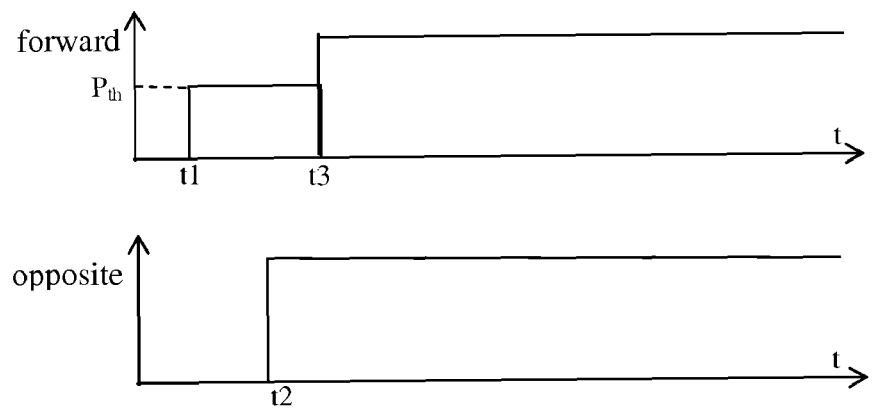
FIG. 3 is a diagram illustrating a self restoration from an APR or an APSD.
Figure 4:
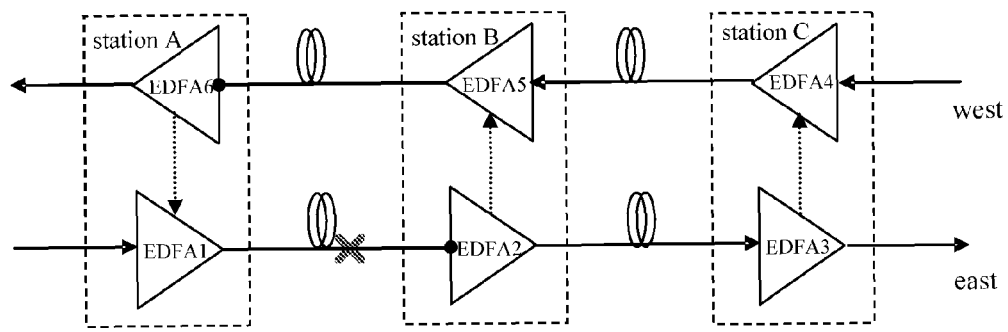
FIG. 4 is a schematic diagram illustrating an embodiment of an optical communication system for suppressing alarms of fiber line faults from downstream stations in accordance with various embodiments of the present disclosure.

FIG. 4 is a schematic diagram illustrating an optical communication system for suppressing downstream alarms induced by a fiber line faults in accordance with various embodiments of the present disclosure. Station A includes an east amplifier EDFA1 and a west amplifier EDFA6, station B includes an east amplifier EDFA2 and a west amplifier EDFA5, and station C includes an east amplifier EDFA3 and a west amplifier EDFA4. Suppose a east fiber segment between station A and station B breaks, the amplifier EDFA2 in east downstream station B detects that input signals of the amplifier EDFA2 are lost via embedded power or piloted signal detection device. Therefore the amplifier EDFA2 may shut down or reduce output of the amplifier EDFA5 which is in the same station serving in a reserve direction so as to avoid a potential laser leakage from station B to station A and instruct station A to shut down or reduce output of the amplifier EDFA1 to avoid a potential laser leakage from station A to station B.

The above procedure is a conventional procedure and is not described in detail. After the amplifier EDFA2 in station B has detected loss of upstream signals, the amplifier EDFA2 still keeps output power within a certain level and inserts an indication signal carrying predetermined alarm suppression information into output optical signals. The amplifier EDFA3 in station C detects the optical signals and the inserted optical indication signal, and determines that a non-adjacent fiber segment breaks according to the piloted signal. Therefore station C keeps in a normal working status and announces no alarm.

The downstream station C may also reduce the output power a little or take other actions, or forward the alarm suppression information to downstream stations without announcing alarm. In addition, on a west link, when station A detects that station B shut down output of optical signals, station A may still keep output power within a certain level just as on the east link, and insert an indication signal carrying a predetermined alarm suppression information into output optical signals so that downstream stations of the station A on the east link announce no alarm and keep in a normal working status.

In various embodiments of the present disclosure, all downstream amplifiers of station B are prevented from unwanted operations via inserting a special indication. In the restoration process, because the downstream amplifiers have always been in normal working status, the whole network is restored as soon as station A and station B is restored to the normal working status. Therefore, much less time is needed in comparison with the conventional restoration mode in which all stations need to be restored one by one.

As an amplifier may generate a surge upon a restoration if the amplifier has been maintaining a high output power without any input power, it is suggested that the downstream output power of the amplifier adjacent to the broken segment is kept below a secure level.

A scheme for loading an indication signal on a service optical channel in the procedure described above includes: loading a low amplitude intensity modulation signal on the service optical channel, i.e. the service optical channel is taken as a bearer for carrying the intensity modulation signal. The intensity modulation signal is received by a downstream station together with the signals on the service optical channel. And the downstream station determines that signals from the upstream station are normal upon a detection of the intensity modulation signal, and further determines that there is no failure on the fiber.

Various embodiments of the scheme are described as follow in detail.

An optical amplifier usually participates in power budgeting of a WDM system to meet requirements of optical multiplexing and de-multiplexing. The optical amplifiers used in the WDM system generally adopts an automatic gain control mode or an automatic power control mode to guarantee that power of optical signals amplified by the optical amplifier is kept steady on each optical channel and power of the single channel is free from being affected by increasing or decreasing optical wavelength signals. In both of the two control modes of the optical amplifier, amplifying the optical signals is implemented through controlling output power of a pump laser of the optical amplifier.

Figure 5:
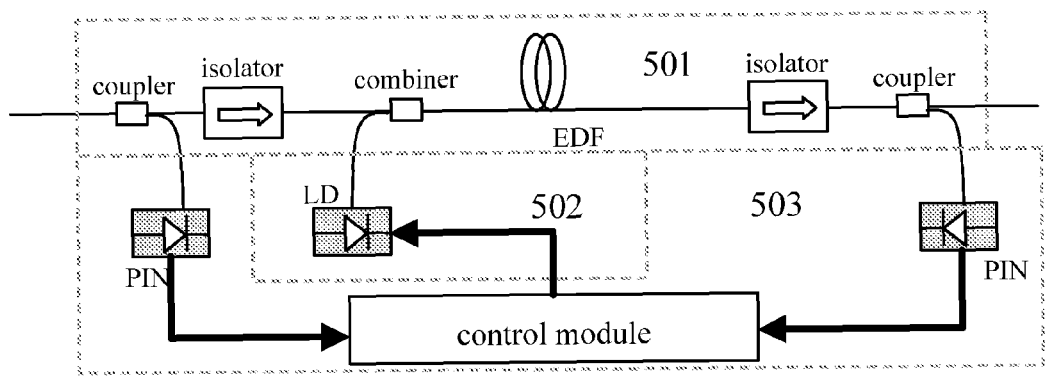
FIG. 5 is a schematic diagram illustrating a structure of an EDFA.

A structure of an EDFA, one of the most popular optical amplifiers, is shown in FIG. 5. The optical amplifier includes a gain unit 501, a pump laser unit 502 and a feedback control unit 503. In FIG. 5, the bold line represents electric signals and the fine line represents optical signals. The gain unit 501 connects to a service optical channel fiber and includes couplers, isolators, a combiner and an Erbium Doped Fiber (EDF). The pump laser unit 502 mainly includes pump laser LDs such as semiconductor lasers. The feedback control unit 503 includes PIN diodes and a control module. A small number of input optical signals that have not yet been amplified by the optical amplifier and a small number of amplified output optical signals are split respectively by the couplers, processed photoelectric conversions by the PIN diodes, and inputted into the control module. The control module analyses the input and output optical signals accordingly so as to control a pump current and output the pump current to the pump laser LD. The pump laser LD generates appropriate pump light intensity in order to guarantee that a needed amplificatory performance is obtained by the signal light and the pump light after processed by the EDF. Detection of the pump light intensity is omitted in FIG. 5. However, in practical applications, the circuit may further include a detection component for detecting intensity of the light output from the pump laser. In addition, multiple pump lasers may be included in the circuit.

In a first embodiment provided by the present disclosure, pump light output from a pump laser is controlled by controlling a control module of an optical amplifier to load a low amplitude intensity modulation signal into output signals of the optical amplifier.

A procedure for loading the low amplitude intensity modulation signal in the embodiment is described as follows in detail by taking an EDFA as an example. An operational principle of the EDFA is that, erbium ions, being pumped to an excited state with pump light, drop to metastable state quickly after a very short relaxation time, and population inversion occurs between the metastable state and a ground state because the erbium ions need a long relaxation time to drop from the metastable state to the ground state. Utilizing the population inversion of the erbium ions, optical signals are amplified. According to the principle, the control module may indirectly control the population inversion of the erbium ions in the EDF through controlling pump current of the pump laser, and thus may further control gain variations of optical signals amplified by the optical amplifier.

Because the life time of the erbium ions in the metastable state is relatively long (about 10 ms), a signal period used for controlling the pump laser should be longer than the life time of erbium ions in the metastable state in the embodiment to perform the low amplitude intensity modulation for the signals on the service optical channel through controlling the pump light output intensity of the pump laser. Otherwise periodic output changes of the pump laser induce no periodic changes of the erbium ion, and thus achieve no low amplitude intensity modulation for the signals output of the amplifier, which results in failing to attain the objective of the present disclosure. Therefore a low-frequency low-amplitude control signal, the period of which is longer than 10 ms, is loaded onto the pump current in the embodiment, and the pump current changes of the pump laser are controlled via a intensity modulation mode or a Pulse Width Modulation (PWM) mode, so that the intensity of the optical signals processed by the optical amplifier shows low-frequency low-amplitude changes and thereby carries the indication signal. The above procedure may be performed by adding a control signal generating module to the control unit of the optical amplifier.

Figure 6:
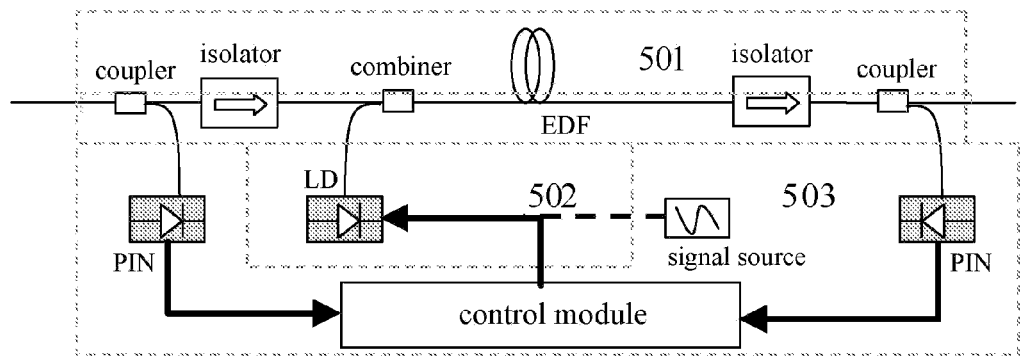
FIG. 6 is a schematic diagram illustrating an embodiment of an optical amplifier for loading an indication signal in a master optical channel by modulating pump current in accordance with various embodiments of the present disclosure.

As shown in FIG. 6, the feedback control unit 503 further includes a signal source with a low-frequency and low-amplitude as the control signal generation module. The signal source generates low-frequency and low-amplitude control signals used for the intensity modulation or the pulse width modulation as required. Variation rules such as amplitude and frequency variation rules of the control signal with a low-frequency and low-amplitude can be predetermined through calculations on the basis of a modulation pattern and characteristics of the intensity modulation signal which needs to be loaded in the master optical channel, e.g. the amplitude and frequency of the signal. The variation rules such as amplitude and frequency variation rules of control signal may be predetermined through experimental method as well. Then the signal source with low-frequency and low-amplitude is configured to generate such control signal and output of the signal source is superposed on the original pump current signal output from the control module. The pump light intensity output by the laser has a low amplitude and periodic variation, and further to introduce a low amplitude variation into the intensity of the optical signal output from the EDFA on the service optical channel. Hence the intensity modulation signal is loaded on the service optical channel. The signal source may also connect to the control module so that the control module controls the output of the signal source.

In addition, the control module may be controlled directly to generate a pump current carrying the control signal. A low-speed control module may be added into the feedback control unit 503 as the control signal generation module. The low-speed control module may be a hardware logic module or a software module. The control module keeps a original function of quick responses to signal changes, for example, when input signal power changes upon a newly added or dropped stream of signals, a high-speed control module immediately adjusts the pump current to an appropriate value on the basis of the signal power variation, so that the optical amplifier amplifies the signals accordingly. Moreover, a time driven slow-speed control module slowly and periodically controls the control module to change the pump current in a small range, so that the pump current output is simultaneously controlled by a fast control program and a slow control program. Such procedure is very similar to superposing a low-frequency and low-amplitude modulation signal on the pump current of the pump laser, and achieves that adding a low amplitude modulation signal in the service optical channel eventually.

Methods for loading the indication signal in the service optical channel is not limited to controlling the pump light of the amplifier. In a second embodiment of the present disclosure, the identifier signal is loaded in the service optical channel by adding a signal intensity modulation module, such as a variable attenuator or a variable gain component, to the service optical channel.

As shown in FIG. 7, a variable attenuator is adopted in the embodiment and the variable attenuator may be a Mach-Zehnder (MZ) modulator or a Variable Optical Attenuator (VOA). The variable attenuator is installed on an upstream station side of the service optical channel and controlled by a control signal output from the control unit, and the control signal is identical with the indication signal required. Changes of the indication signal induces changes of attenuation capacity of the variable attenuator and further controls changes of optical power on the service optical channel, so as to modulate the indication signal to the service optical channel. Preferably, the variable attenuator is installed at a location of outputting optical signals in the optical amplifier and connected to the feedback control unit 503 of the optical amplifier. The feedback control unit 503 controls the variable attenuator by outputting control signals. In such case, a signal source needs to be added in the feedback control unit 503 of the optical amplifier to output the control signal to a control side of the variable attenuator. In addition, as shown in FIG. 8, the signal source can be connected to and controlled by the control module of the feedback control unit 503. It can be seen that, compared with the first embodiment, the second embodiment is advantageous in that the control signal is generally identical with the indication signal which needs to be loaded and no more calculation for the control signal based on the indication signal is required.

In addition, a variable gain component added on the service optical channel can provide completely the same function as the variable attenuator. The variable gain component may be a semiconductor laser or an EDF, etc.

Other types of optical amplifiers apart from the EDFA, e.g. rare earth element doped fiber amplifiers, semiconductor optical amplifiers, may also be used for transmitting and detecting the indication signal, as long as the optical amplifiers do not amplify optical signals by pumping pump light to transmission fibers between stations.

To sum up, the above are exemplary embodiments of the present disclosure and are not for use in limiting the protection scope of the present disclosure. All the modifications, equivalent replacements or improvements within the principles of the present disclosure shall be covered by the protection scope of the present disclosure.

What is claimed is:

1. A method for handling a fiber line fault, comprising:
generating, by a first optical amplifier station, a control signal to control a pump laser unit to generate an indication signal upon detection of a fault on its adjacent upstream fiber line, wherein a period of the control signal is longer than a life time of high-energy-ions excited state;
loading, by a first optical amplifier station, the indication signal carrying alarm suppression information onto an optical signal to be output to a downstream fiber; and
maintaining, by a second amplifier station which is a downstream optical amplifier station of the first optical amplifier station, a normal working status upon a receipt of the optical signal with the indication signal.

2. The method of claim 1, further comprising:
reducing, by the first optical amplifier station, upon the detection of the fault on the upstream fiber line, output power of the optical signal to a safety level or to a level below the safety level.

3. The method of claim 1, wherein the indication signal is an intensity modulation signal.

4. The method of claim 1, wherein loading the indication signal onto the optical signal comprises:
controlling a pump unit of an optical amplifier in the first optical amplifier station; or
controlling a variable gain component or a variable attenuator on a output side of an optical amplifier in the first optical amplifier station.

5. A method of claim 1, further comprising:
stopping loading, by the first optical amplifier station, upon detection of restoration of the fiber line fault, the indication signal carrying the alarm suppression information onto the optical signal to restore a normal working status.

6. An optical amplifier station, comprising:
a control unit, configured to load a control signal onto a pump current through adjusting the pump current, upon a detection of a fault on upstream fiber line, wherein a period of the control signal is longer than a life time of high-energy-ions excited state;

a pump laser unit, configured to generate pump light and control the pump light to change according to a predetermined pattern based on the pump current from the control unit; and a gain unit, configured to amplify an input optical signal, and output the amplified input optical signal; wherein the gain unit is further configured to load, according to the pump light from the pump laser unit, an indication signal carrying alarm suppression information onto the optical signal to be output to make a downstream optical amplifier station of the optical amplifier station to maintain a normal working status after receiving the optical signal with the indication signal.

7. The optical amplifier station of claim 6, wherein the optical amplifier station comprises a rare earth element doped fiber amplifier.

8. The optical amplifier station of claim 6, wherein the period of the control signal is longer than the life time of high-energy-ions excited state in the gain unit.

9. An optical communication system for suppressing downstream alarms induced by a fiber line fault, comprising at least two optical amplifier stations connected with a fiber, wherein:

a upstream optical amplifier station is configured to load an indication signal carrying alarm suppression information onto optical signal to be output, upon detection of a fiber line fault on a fiber link adjacent to the upstream optical amplifier station; wherein the upstream optical amplifier station generates the indication signal using a control unit, configured to load a control signal onto a pump current through adjusting the PUMP current, upon detection of the fiber line fault, and wherein a period of the control signal is longer than a life time of high-energy-ions excited state; and a downstream optical amplifier station is configured to keep in a normal working status, upon a receipt of the indication signal carrying the alarm suppression information.

10. The optical communication system of claim 9, wherein the upstream optical amplifier station comprises an optical amplifier and the optical amplifiers comprises:

the control unit;

a pump laser unit, configured to generate pump light and control the pump light to change according to a predetermined pattern based on the pump current from the control unit; and a gain unit, configured to load an indication signal carrying alarm suppression information onto optical signal according to the pump light from the pump laser unit, amplify and output the optical signals.

11. A method for handling a fiber line fault, comprising:

detecting, by a first optical amplifier station, whether there is a fault on its adjacent upstream fiber line;

if the first optical amplifier station detects that there is a fault on its upstream fiber line, keeping, by the first optical amplifier station, outputting an optical signal on a service channel, and loading an indication signal carrying alarm suppression information onto the optical signal on the service channel; and maintaining, by a second optical amplifier station which is the downstream optical amplifier station of the first optical amplifier station, a normal working status without loading an indication signal related with the fault onto the optical signal to be output from the second optical amplifier station upon receiving the optical signal with the indication signal.

12. The method of claim 11, wherein the power of the optical signal output by the first optical amplifier station is kept below a preset safety level.

13. The method of claim 11, wherein the indication signal is an intensity modulation signal.

14. The method of claim 11, wherein loading the indication signal carrying alarm suppression information onto the optical signal on the service channel comprises:

generating a control signal to control a pump laser unit of the first optical amplifier station to make the indication signal loaded onto the optical signal; or controlling a variable gain component or a variable attenuator on an output side of an optical amplifier in the first optical amplifier station.

15. The method of claim 14, wherein a period of the control signal is longer than a life time of high-energy-ions excited state.

16. The method of claim 11, further comprising:

stopping loading, by the first optical amplifier station, upon detection of restoration of the fiber line fault, the indication signal carrying the alarm suppression information onto the optical signal to restore a normal working status.

* * * * *